United States Patent
Young et al.

(10) Patent No.: US 8,237,410 B2
(45) Date of Patent: Aug. 7, 2012

(54) HANDHELD DEVICE WITH FAST-CHARGING CAPABILITY

(75) Inventors: Sea-Weng Young, Taipei County (TW); Chuan-Yi Chang, Taipei County (TW)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 492 days.

(21) Appl. No.: 12/430,692

(22) Filed: Apr. 27, 2009

(65) Prior Publication Data

US 2009/0273319 A1 Nov. 5, 2009

(30) Foreign Application Priority Data

Apr. 30, 2008 (TW) .............................. 97115934 A

(51) Int. Cl.
*H02J 7/00* (2006.01)
(52) U.S. Cl. ........................................ 320/134; 320/136
(58) Field of Classification Search .......... 320/100–167; 324/425–437
See application file for complete search history.

(56) References Cited

U.S. PATENT DOCUMENTS

| | | | |
|---|---|---|---|
| 6,928,372 B2 * | 8/2005 | Pozsgay et al. | 702/63 |
| 7,667,350 B2 * | 2/2010 | Norimatsu et al. | 307/87 |
| 7,884,575 B2 * | 2/2011 | Shin et al. | 320/132 |
| 2004/0217733 A1 * | 11/2004 | Liu et al. | 320/114 |
| 2005/0077878 A1 * | 4/2005 | Carrier et al. | 320/134 |

FOREIGN PATENT DOCUMENTS

TW M317700 8/2007

* cited by examiner

*Primary Examiner* — Patrick Assouad
*Assistant Examiner* — Alesa Allgood
(74) *Attorney, Agent, or Firm* — Muncy, Geissler, Olds & Lowe, PLLC

(57) ABSTRACT

A handheld device with a fast-charging capability is adapted to be connected to a charger to obtain an electric power. The handheld device includes a battery, a charging circuit, a safety circuit, a control unit, and an input module. The charging circuit is electrically connected to the charger and transfers an electric power to the battery. The safety circuit is used for restricting an upper limit of the electric power transferred by the charging circuit. The input module is provided for a user to input an emergency charge command. Upon receiving the emergency charge command, the control unit instructs the safety circuit to lower the restriction on the charging circuit, so as to raise the upper limit of the electric power that can be obtained by the charging circuit, thereby accelerating the charging of the battery.

9 Claims, 6 Drawing Sheets

HANDHELD DEVICE WITH FAST-CHARGING CAPABILITY

CROSS-REFERENCE TO RELATED APPLICATION

This application claims the benefit of Taiwan Patent Application No. 097115934, filed on Apr. 30, 2008, which is hereby incorporated by reference for all purposes as if fully set forth herein.

BACKGROUND OF THE INVENTION

1. Field of the Invention

The present invention relates to a handheld device, and more particularly to a handheld device with a fast-charging capability.

2. Related Art

With the rapid technological progress and vigorous competition, Business trip is rapidly becoming common. In addition, people have taken mobile phones along with them even on a tour in holidays. In order to avoid the mobile phones from running out of power, people have to carry different charging cradles on each trip or tour. Unfortunately, since there are various kinds of mobile phones, if one has several kinds of mobiles phones, he/she has to carry many different charging cradles or travel chargers of different brands, which is rather inconvenient. Therefore, currently, most manufacturers carry out research and development on multipurpose charging cradles for mobile phones, so as to avoid the above inconveniences.

For example, in Taiwan, R.O.C. Utility Model No. M317700, entitled "Multipurpose Mobile Phone Charging Cradle", the technical features thereof lie in that a plurality of cable holes of different specifications are respectively configured on the cylindrical-shaped body for power cables of mobile phone chargers with different specifications to pass there through, and a rotary disk is assembled outside each of the cable holes to shield the unused cable holes, so as to achieve a nice appearance.

However, the prior art has unavoidable defects.

Although the user who has several kinds of mobile phones may not have to carry various different charging cradles, he/she may not always carry the charging cradle on a short business trip or a one-day visit. If the user forgot to charge the mobile phone before going on the business trip, the mobile phone may probably run out of power in the middle of the trip, and as a result, the user cannot make phone calls or continue the work.

Moreover, the user urgently needs to use the mobile phone in the current day, but the mobile phone is out of power. In such a situation, the mobile phone cannot be used in a short time no matter what kind of charging cradle or travel charger is used. Therefore, even the multipurpose charging cradle or travel charger does not make sense.

Besides, the charging circuits of the charging cradles adopt a low voltage and a low current to charge the battery of the mobile phone slowly, which mainly aims at protecting the battery from being damaged by a high voltage and a high current, and as a result, the service life thereof may be greatly shortened. Therefore, the user cannot fast charge the battery to enable a long-time operation of the mobile phone even at the cost of shortening the service life of the battery. Since the conventional charging cradles do not provide a charging circuit or a charging mechanism for fast charging the battery with a high current at the cost of sacrificing the service life of the battery, the user can only get used to the current charging mode.

SUMMARY OF THE INVENTION

Accordingly, the present invention is directed to a handheld device with a fast-charging capability.

In one embodiment, the present invention provides a handheld device with a fast-charging capability, which is connected to a charger to obtain an electric power. The handheld device includes a battery, a charging circuit, a safety circuit, a control unit, and an input module.

The charging circuit is electrically connected to the charger and outputs a charge signal to the control unit when obtaining the electric power. The control unit instructs the charging circuit to transfer the electric power to the battery. The safety circuit restricts an upper limit of a current transferred by the charging circuit. The input module is provided for a user to input an emergency charge command to the control unit. Upon receiving the emergency charge command, the control unit instructs the safety circuit to lower the restriction on the charging circuit, so as to raise a current value that can be transferred by the charging circuit.

In another embodiment, the present invention provides a handheld device with a fast-charging capability, which further includes a detection circuit. The safety circuit further includes a current-limit sensing circuit and a battery sensing circuit. The detection circuit outputs a limit signal to the control unit when detecting that the battery reaches an upper limit for an electric quantity of itself, such that the control unit instructs the charging circuit to stop transferring the electric power to the battery. When the safety circuit releases the restriction on the charging circuit, the current-limit sensing circuit and the battery sensing circuit are respectively used to sense the current limits of the electric power carried by the charging circuit and the battery, so as to adjust the upper limit of the electric power transferred by the charging circuit.

The present invention has the efficacy that cannot be achieved in the prior art, that is, the handheld device can increase the electric quantity of the battery in a short time by fast charging even if the user forgot to charge the battery. Although the service life of the battery is probably shortened due to the high current used for fast charging the battery, the battery can obtain an electric power required by the operation of the handheld device in a short time.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make the objectives, structural features, and functions of the present invention comprehensible, relevant embodiments accompanied with figures are described in detail below.

Figure 1:
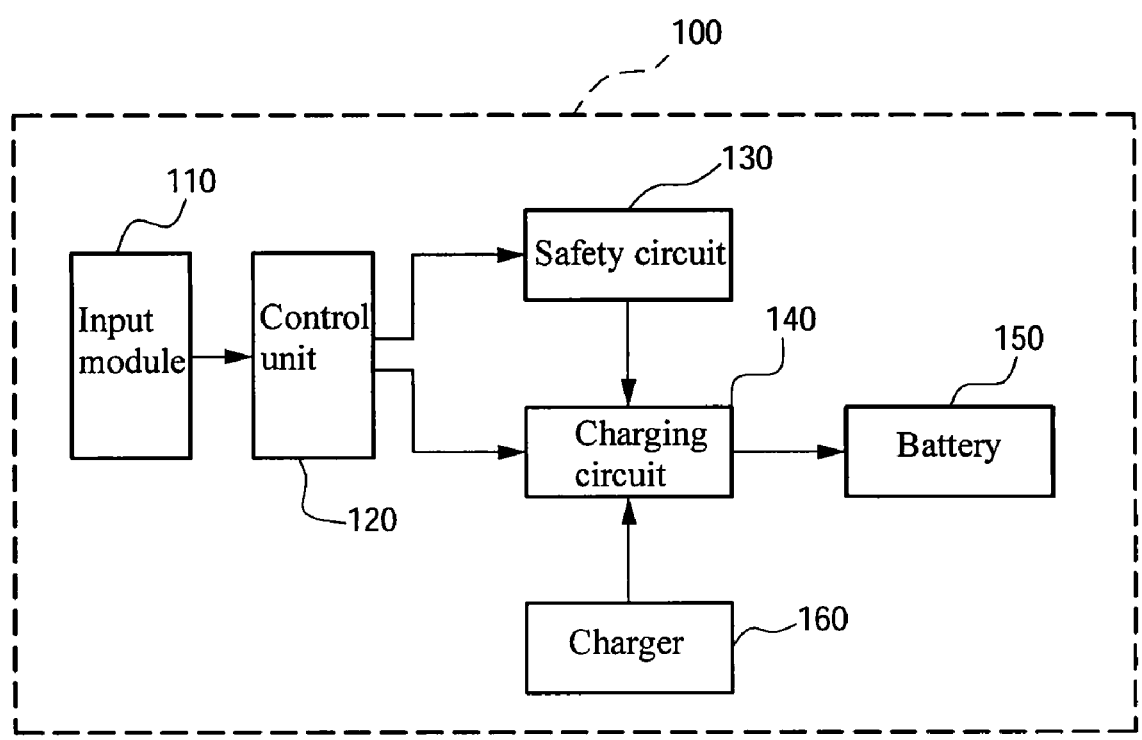
FIG. 1 is a schematic structural view of a circuit according to a first embodiment of the present invention.

FIG. 1 is a schematic architectural view of a circuit according to a first embodiment of the present invention. A handheld device 100 is connected to an external charger 160 or a charging cradle to obtain an electric power for charging. The handheld device 100 includes a battery 150, a charging circuit 140, a safety circuit 130, a control unit 120, and an input module 110.

The battery 150 stores an electric quantity required by an operation of the handheld device 100 therein. When the battery 150 is in a state of low battery, the handheld device 100 has to be connected to the charger 160. The charging circuit 140 of the handheld device 100 is connected to the charger 160 to obtain the electric power and first outputs a charge signal to the control unit 120. The control unit 120 immediately instructs the charging circuit 140 to transfer the electric power to the battery 150. The safety circuit 130 is used for restricting an upper limit of the electric power transferred by the charging circuit 140.

The input module 110 is provided for a user to input an emergency charge command. Upon receiving the emergency charge command, the control unit 120 instructs the safety circuit 130 to lower the restriction on the charging circuit 140 to a certain extent, so as to achieve a larger charging current, thereby raising a current value that can be obtained by the charge circuit 140.

The input module 110 may be a keyboard set, a touch panel, a touch screen, or an additionally configured function key of the handheld device 100.

Figure 2:
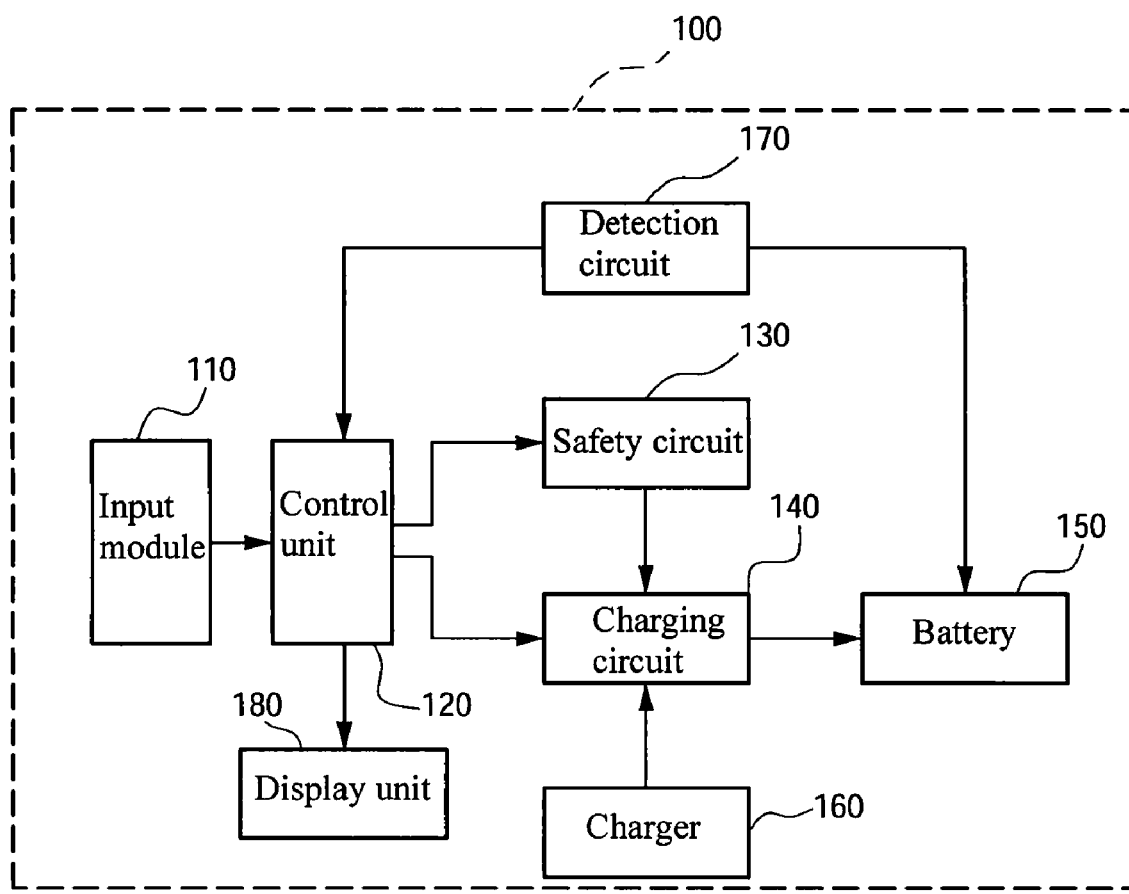
FIG. 2 is a schematic structural view of a circuit according to a second embodiment of the present invention.

FIG. 2 is a schematic architectural view of a circuit according to a second embodiment of the present invention. Unlike the first embodiment, the second embodiment further includes a detection circuit 170 and a display unit 180. The detection circuit 170 is connected to the battery 150 and used for detecting the electric quantity of the battery 150. When the electric quantity of the battery 150 reaches an upper limit, the detection circuit 170 outputs a limit signal. Upon receiving the limit signal, the control unit 120 stops the charging circuit 140 from transferring the electric power to the battery 150, so as to avoid the overload of the battery 150.

In addition, when transferring the electric power, the charging circuit 140 calculates an electric quantity of the electric power transferred per time unit. The control unit 120 calculates a charging complete time of the battery 150 according to the electric quantity of the transferred electric power calculated by the charging circuit 140 and the electric quantity of the battery 150 detected by the detection circuit 170. Therefore, before and after the safety circuit 130 releases the restriction on the charging circuit 140, the display unit 180 shows different charging complete time.

Figure 3:
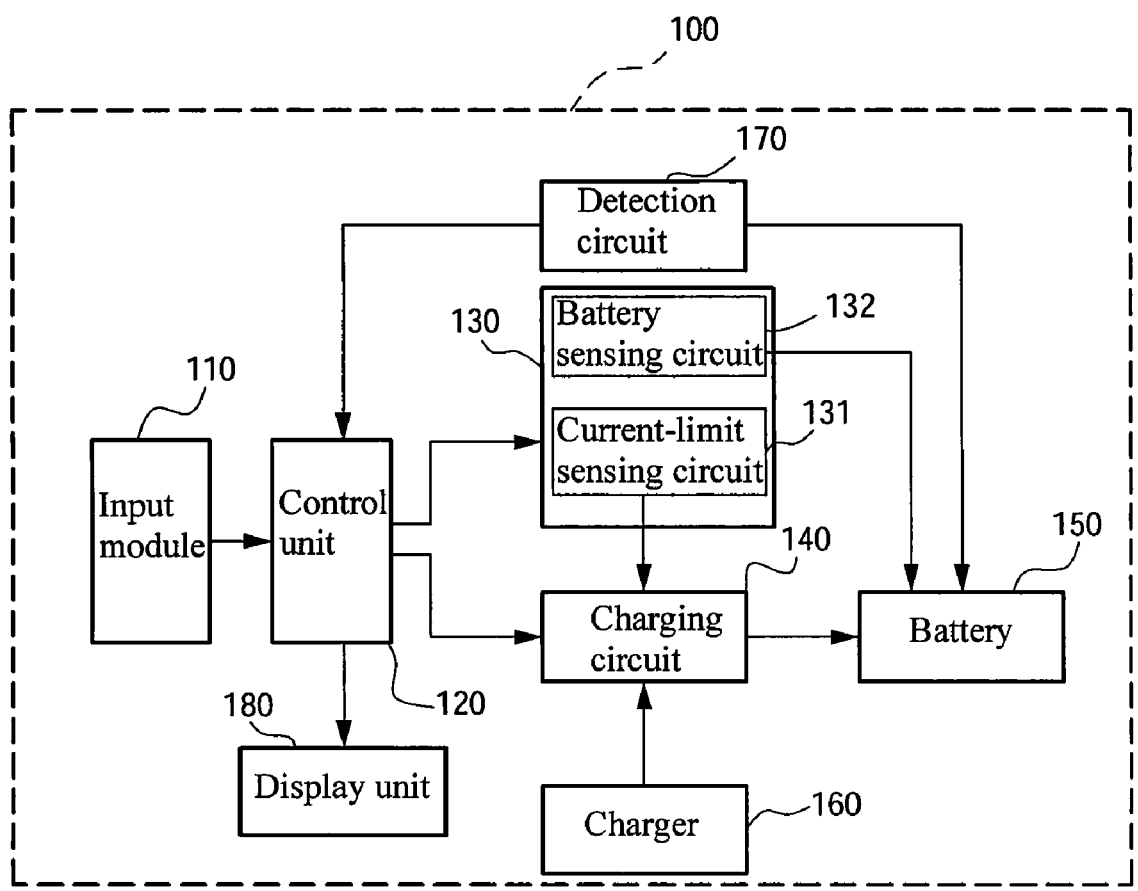
FIG. 3 is a schematic structural view of a circuit according to a third embodiment of the present invention.

FIG. 3 is a schematic architectural view of a circuit according to a third embodiment of the present invention. Unlike the second embodiment, the safety circuit 130 in the third embodiment includes a current-limit sensing circuit 131 and a battery sensing circuit 132.

In an example, when the safety circuit 130 releases the restriction on the charging circuit 140, the current-limit sensing circuit 131 is used to detect or calculate a limit of the electric power carried by the charging circuit 140 and meanwhile the battery sensing circuit 132 is used to detect or calculate a limit of the electric power carried by the battery 150, so that the safety circuit 130 adjusts the upper limit of the electric power transferred by the charging circuit 140 before the charging circuit 140 or the battery 150 is overloaded.

For example, when the safety circuit 130 releases the restriction on the charging circuit 140, the current-limit sensing circuit 131 detects that the limit of the electric power carried by the charging circuit 140 is 10 voltages (V) and a current thereof is 3 amperes (A), and meanwhile, the electric power obtained by the charging circuit 140 approaches 10 V/3 A, so that the charging circuit 140 is restricted to only obtain the electric power less than 10 V/3 A, so as to avoid the overload of the charging circuit 140.

Figure 4:
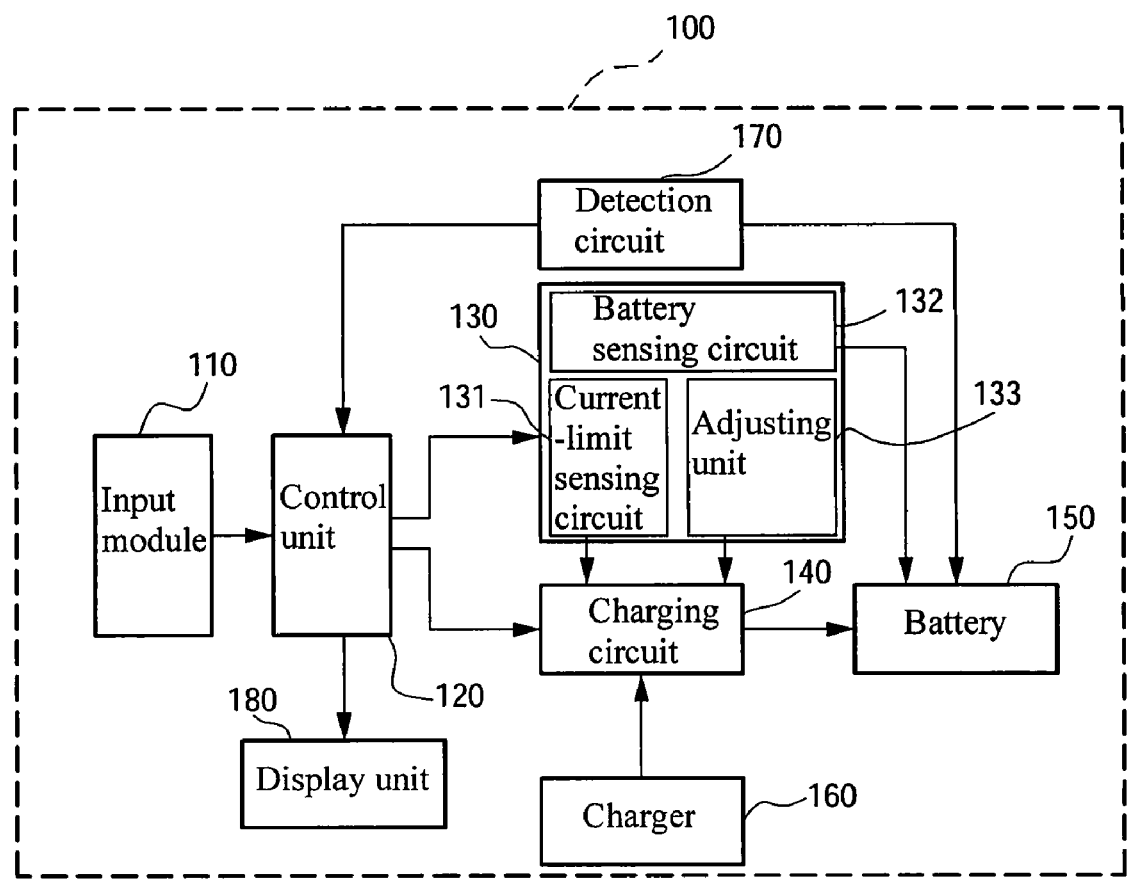
FIG. 4 is a schematic structural view of a circuit according to a fourth embodiment of the present invention.

FIG. 4 is a schematic architectural view of a circuit according to a fourth embodiment of the present invention. Unlike the third embodiment, the safety circuit 130 in the fourth embodiment further includes an adjusting unit 133.

The adjusting unit 133 has setting values for adjusting a plurality of upper limits of the electric power transferred by the charging circuit 140. The emergency charge command issued via the input module 110 contains adjusting information. According to the adjusting information, the control unit 120 instructs the safety circuit 130 to adjust the charging by the adjusting unit 133. The adjusting unit 133 extracts a setting value of a relevant upper limit of the electric power to adjust the upper limit of the electric power that can be obtained by the charging circuit 140 according to the adjusting information. The user may issue an emergency charge command with different adjusting information depending upon different situations, so as to enable the handheld device 100 to perform the fast charging operation at different efficiencies.

It is assumed that the normal specification of the battery 150 is 1000 mAh, the maximum electric power of the battery 150 is 4.2 V/2 A, and the upper limit that can be adjusted by the adjusting unit 133 includes a plurality of specifications, for example, (1) 2 A, a charging time of 12 minutes, and a completed electric quantity of 40%; (2) 1 A, a charging time of 24 minutes, and a completed electric quantity of 40%; (3) 0.5 A, a charging time of 48 minutes, and a completed electric quantity of 40%. In an emergency, the user may input an emergency charge command with the adjusting information of 2 A to adjust the upper limit of the electric power transferred by the charging circuit 140 to 2 A, so as to fast charge the battery 150. Meanwhile, the charging time is somewhat limited, so as to avoid the safety risk of overheating the battery. At other moments, the user may select other specifications to charge the battery 150 according to the actual situation.

Figure 5:
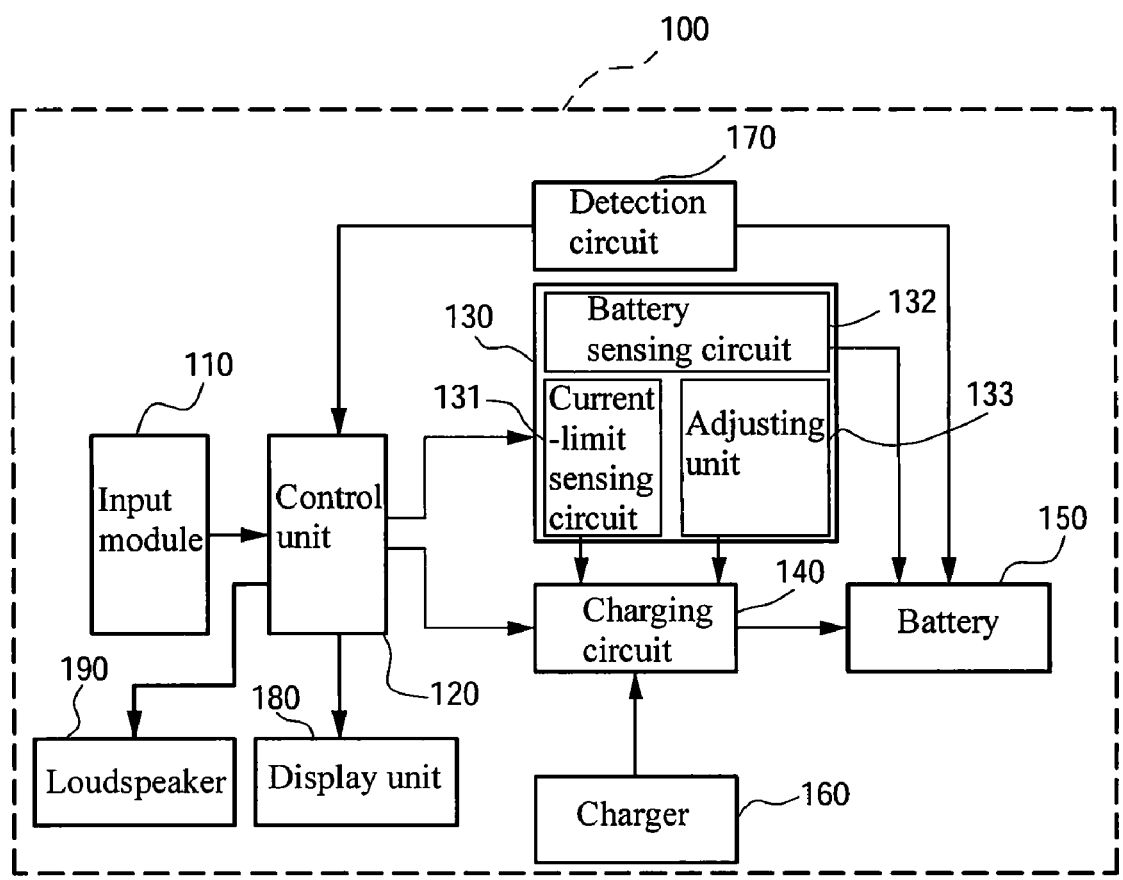
FIG. 5 is a schematic structural view of a circuit according to a fifth embodiment of the present invention.

FIG. 5 is a schematic architectural view of a circuit according to a fifth embodiment of the present invention. Unlike the fourth embodiment, the fifth embodiment further includes a loudspeaker 190.

When instructing the safety circuit 130 to release the restriction on the charging circuit 140, the control unit 120 outputs an emergency charge signal, which may be a text signal, an audio signal, or an image signal. The text signal and the image signal may be displayed on the display unit 180, and the audio signal is broadcasted via the loudspeaker 190.

Figure 6:
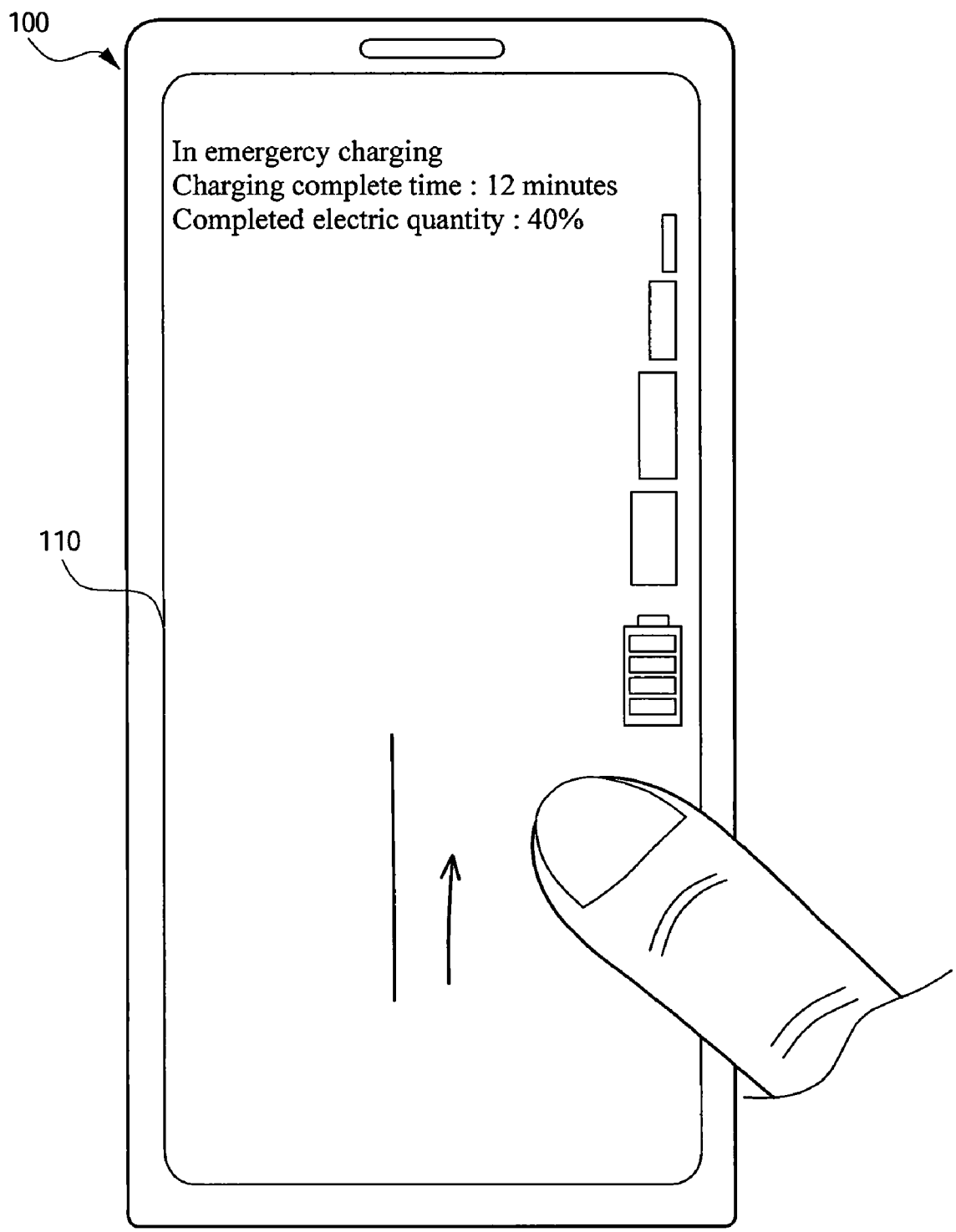
FIG. 6 is a schematic view of an emergency charging according to an embodiment of the present invention.

FIG. 6 is a schematic view of an emergency charging according to an embodiment of the present invention. In this embodiment, the input module 110 of the handheld device 100 is a touch screen with a track recognition instruction built in, for example, sliding from bottom to top, for triggering the emergency charge command. Upon obtaining the emergency charge command, the handheld device 100 performs the fast charging operation and displays the emergency charge signal and the charging complete time on the touch screen, which is convenient for the user to know relevant information of the charging operation.

In the example shown in FIG. 6, the displayed emergency charge signal is "In Emergency Charging". The emergency charging of the battery 150 lasts only for 12 minutes. After the emergency charging operation is completed, the battery has an electric quantity of about 40% for use.

The above descriptions of the preferred embodiments are only intended to illustrate the present invention, but not to limit the present invention. Various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld device with a fast-charging capability, connected to a charger to obtain an electric power, comprising:
    a battery;
    a charging circuit, electrically connected to the charger and outputting a charge signal when obtaining the electric power;
    a safety circuit, connected to the charging circuit, for restricting an upper limit of a current transferred by the charging circuit, wherein the safety circuit comprises an adjusting unit for storing a plurality of setting values, wherein the safety circuit further comprises a current-limit sensing circuit, and when the safety circuit releases the restriction on the charging circuit, the current-limit sensing circuit detects a limit of an electric power carried by the charging circuit so as to enable the safety circuit to adjust the upper limit of the electric power transferred by the charging circuit;
    an input module, for a user to input an emergency charge command; and
    a control unit, connected to the charging circuit and the safety circuit, for instructing the charging circuit to transfer a current to the battery when obtaining the charge signal, and instructing the adjusting unit to adjust a restriction on the charging circuit through using a setting value corresponding an adjusting information contained in the emergency charge command according to the adjusting information when obtaining the emergency charge command.

2. The handheld device with a fast-charging capability according to claim 1, further comprising a detection circuit, for detecting an electric quantity of the battery, and outputting a limit signal to the control unit when the electric quantity of the battery reaching an upper limit is detected, such that the control unit stops the charging circuit from transferring the electric power to the battery.

3. The handheld device with a fast-charging capability according to claim 1, wherein the safety circuit further comprises a battery sensing circuit, and when the safety circuit releases the restriction on the charging circuit, the battery sensing circuit detects a limit of an electric power carried by the battery, so as enable the safety circuit to adjust the upper limit of the electric power transferred by the charging circuit.

4. The handheld device with a fast-charging capability according to claim 1, further comprising a detection circuit for detecting an electric quantity of the battery, and the charging circuit calculating an electric quantity of the transferred electric power, so as to enable the control unit to calculate a charging complete time of the battery according to the electric quantity of the electric power transferred by the charging circuit and the electric quantity of the battery.

5. The handheld device with a fast-charging capability according to claim 4, further comprising a display unit, wherein the control unit outputs the charging complete time of the battery to be displayed on the display unit.

6. The handheld device with a fast-charging capability according to claim 1, wherein when instructing the safety circuit to lower the restriction on the charging circuit, the control unit outputs an emergency charge signal.

7. The handheld device with a fast-charging capability according to claim 6, further comprising a display unit, wherein the emergency charge signal output by the control unit is a text signal and is displayed on the display unit.

8. The handheld device with a fast-charging capability according to claim 6, further comprising a loudspeaker, wherein the emergency charge signal output by the control unit is an audio signal and is broadcasted via the loudspeaker.

9. The handheld device with a fast-charging capability according to claim 6, further comprising a display unit, wherein the emergency charge signal output by the control unit is an image signal and is displayed on the display unit.

* * * * *